US012547226B2

(12) United States Patent
     Chuang

(10) Patent No.: US 12,547,226 B2
(45) Date of Patent: Feb. 10, 2026

(54) SMART TEMPERATURE CONTROL SYSTEM OF NETWORK EQUIPMENT

(71) Applicant: ALPHA NETWORKS INC., Hsinchu (TW)

(72) Inventor: Kun-Neng Chuang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 418 days.

(21) Appl. No.: 18/134,840

(22) Filed: Apr. 14, 2023

(65) Prior Publication Data

US 2024/0160259 A1    May 16, 2024

(30) Foreign Application Priority Data

Nov. 10, 2022   (TW) .................................. 111142998

(51) Int. Cl.
     *G06F 1/20*         (2006.01)
     *G05B 15/02*        (2006.01)
(52) U.S. Cl.
     CPC ............. *G06F 1/206* (2013.01); *G05B 15/02* (2013.01)
(58) Field of Classification Search
     CPC . G05B 15/02; G06F 1/181; G06F 1/20; G06F 1/206; G06F 16/3326;
     (Continued)

(56) References Cited

U.S. PATENT DOCUMENTS 5,456,081 A * 10/1995 Chrysler ................ H10N 10/13
                                                165/185
6,032,724 A *  3/2000 Hatta .................. H01L 21/67103
                                                118/724
(Continued)

FOREIGN PATENT DOCUMENTS

CN       115016622      *  6/2022
TW       M617146 U          9/2021
(Continued)

OTHER PUBLICATIONS

Taiwanese Search Report for corresponding Taiwanese Application No. 111142998, dated Mar. 14, 2023, with English translation.

*Primary Examiner* — Chun Cao
(74) *Attorney, Agent, or Firm* — Birch, Stewart, Kolasch & Birch, LLP

(57) ABSTRACT

A smart temperature control system of a network equipment includes a motherboard disposed on a plate of a case, wherein a cooling chip is disposed between the plate and a portion of the motherboard where a temperature-controlled member is disposed on. A system CPU controlling circuit on the motherboard receives an information of a real-time temperature and a model of the temperature-controlled member, and obtains an operating temperature range of the temperature-controlled member by comparing the information of the model of the temperature-controlled member received with different models of the temperature-controlled member in a memory. When the real-time temperature of the temperature-controlled member falls out of the operating temperature range of the temperature-controlled member, the system CPU controlling circuit controls a power-driving circuit to drive the cooling chip via voltages with opposite polarities to cool or heat the motherboard and the temperature-controlled member disposed on the motherboard.

20 Claims, 8 Drawing Sheets

(58) Field of Classification Search
CPC .. G06F 16/3329; G06F 16/338; G06F 16/345;
G06F 16/35; G06F 40/35
USPC .......................................................... 700/300
See application file for complete search history.

(56) References Cited

U.S. PATENT DOCUMENTS

| | | | | |
|---|---|---|---|---|
| 6,111,513 | A * | 8/2000 | Goto ...................... | H10N 10/00 |
| | | | | 257/712 |
| 2011/0225982 | A1* | 9/2011 | Zhou ....................... | H01L 23/38 |
| | | | | 62/3.7 |
| 2017/0229373 | A1* | 8/2017 | Kim ....................... | H10N 10/17 |
| 2021/0247786 | A1* | 8/2021 | Kobayashi ............. | G05D 23/27 |
| 2023/0232590 | A1* | 7/2023 | Tunks .................. | H05K 1/0203 |
| | | | | 361/679.46 |

FOREIGN PATENT DOCUMENTS

| | | |
|---|---|---|
| TW | 202141660 A | 11/2021 |
| TW | M623672 U | 2/2022 |

* cited by examiner

SMART TEMPERATURE CONTROL SYSTEM OF NETWORK EQUIPMENT

BACKGROUND OF THE INVENTION

Technical Field

The present invention relates generally to a system of a network equipment, and more particularly to a smart temperature control system of a network equipment.

Description of Related Art

For a conventional network communication equipment, a way of adjusting and controlling a plurality of chips or a plurality of optical fiber modules disposed on a motherboard is mainly to remove a heat energy by an air stream that is provided by a fan disposed in a system to pass through a surrounding of the chips or the optical fiber modules, lowering a temperature of such thermally sensitive electronic components through heat dissipation by the air stream.

Such conventional way of heat dissipation through the air stream provided by the fan could lower the temperature of the chips or the optical fiber modules in the system during operating. However, when the chips are activated at a low temperature, such temperature adjustment and control way by using the fan cannot heat the chips to a suitable operation temperature range upon being activated. Additionally, if there is a need to strengthen the cooling effect of the fan, the conventional way can only be carried out by increasing the amount of the air stream, however, not all of the chips or all of the electronic components in the conventional network communication equipment are thermally sensitive and require to be cooled, and such conventional way of cooling indiscriminately would cause a problem that a power consumption of the conventional network communication equipment cannot be lowered, and a lifetime of the fan is reduced, and a high rotation speed of the fan would cause a high-frequency noise.

BRIEF SUMMARY OF THE INVENTION

In view of the above, the primary objective of the present invention is to specifically dispose a cooling chip for a particular temperature-controlled member on a motherboard and to contact a surface of the cooling chip with a plate of a case serving as a heat dissipating plate having a large area or a cooling plate, allowing the cooling chip to cool or heat the temperature-controlled member via another surface of the cooling chip, thereby keeping the temperature-controlled member in an operating temperature range of operation specification of the temperature-controlled member.

The present invention provides a smart temperature control system of a network equipment including a case, a motherboard, and at least one cooling chip. The case has a plate. The motherboard is disposed in the case, wherein a system CPU controlling circuit, a power-driving circuit, and at least one temperature-controlled member are disposed on the motherboard. The system CPU controlling circuit includes a memory storying an operating temperature range of different models of the at least one temperature-controlled member, and is electrically and respectively connected to the power-driving circuit and the at least one temperature-controlled member, and receives an information of a real-time temperature and a model of the at least one temperature-controlled member. The system CPU controlling circuit obtains an operating temperature range of the at least one temperature-controlled member by comparing the information of the model of the at least one temperature-controlled member received with the different models of the at least one temperature-controlled member in the memory.

The at least one cooling chip is engaged between the plate and a portion of the motherboard where the at least one temperature-controlled member is disposed on, and is electrically connected to the power-driving circuit to be driven by the power-driving circuit via a voltage with a first polarity or a voltage with a second polarity opposite to the first polarity. The system CPU controlling circuit compares the real-time temperature of the at least one temperature-controlled member with the operating temperature range of the at least one temperature-controlled member; when the real-time temperature of the at least one temperature-controlled member is higher than the operating temperature range of the at least one temperature-controlled member, the system CPU controlling circuit controls the power-driving circuit to drive the at least one cooling chip via the voltage with the first polarity to cool the motherboard and the at least one temperature-controlled member disposed on the motherboard, and heat dissipation is performed by the plate; when the real-time temperature of the at least one temperature-controlled member is lower than the operating temperature range of the at least one temperature-controlled member, the system CPU controlling circuit controls the power-driving circuit to drive the at least one cooling chip via the voltage with the second polarity to heat the motherboard and the at least one temperature-controlled member disposed on the motherboard.

With the aforementioned design, no matter the at least one temperature-controlled member during booting or operating is at the temperature lower than or higher than the operating temperature range of the at least one temperature-controlled member, the at least one temperature-controlled member that requires temperature control could be cooled or heated through the system CPU controlling circuit controlling the power-driving circuit to drive the corresponding cooling chip, and the efficiency of cooling or heating could be increased by the cooling chip contacting with the plate, thereby keeping the at least one temperature-controlled member in the operating temperature range for properly operating. When the smart temperature control system includes different temperature-controlled members with commercial specifications or industrial specifications, the temperature-controlled members with commercial specifications having a comparatively insufficient temperature margin could be specifically cooled or heated for properly operating at an environment with a high or low temperature that is suitable for the temperature-controlled members with industrial specifications, thereby the system could continue operating without using additional temperature control ways, such as increasing a rotation speed of a fan in the system. Moreover, when the smart temperature control system of the present invention is applied to a network communication equipment with a fan for temperature control, a rotation speed of the fan is not required to increase as the temperature-controlled member requiring temperature control could be specifically cooled by the at least one cooling chip, thereby lowering a power consumption of the fan, and increasing a lifetime of the fan, and avoiding the noise of the fan upon operating at a high rotation speed.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
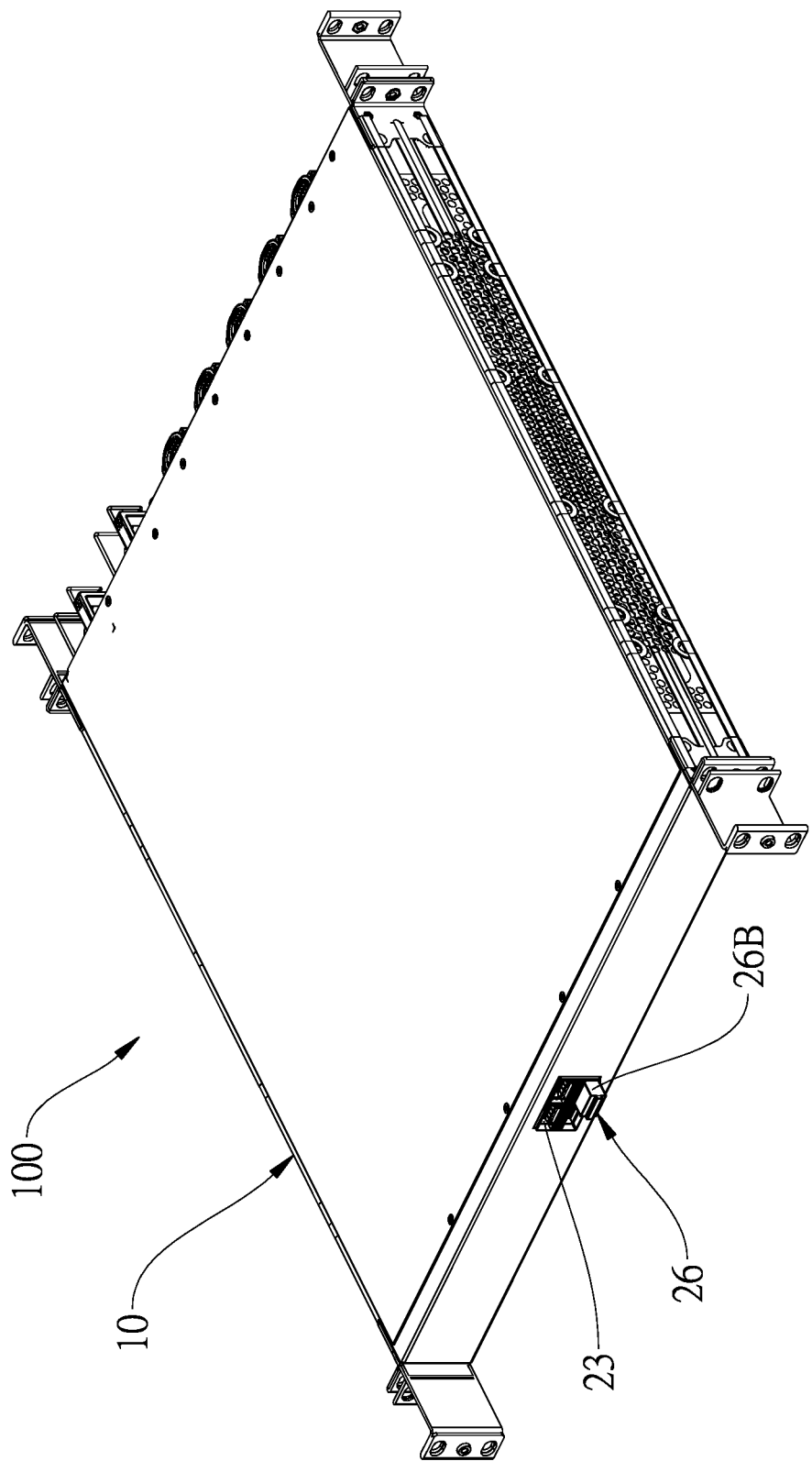
FIG. 1 is a perspective view of the smart temperature control system according to an embodiment of the present invention.
Figure 2:
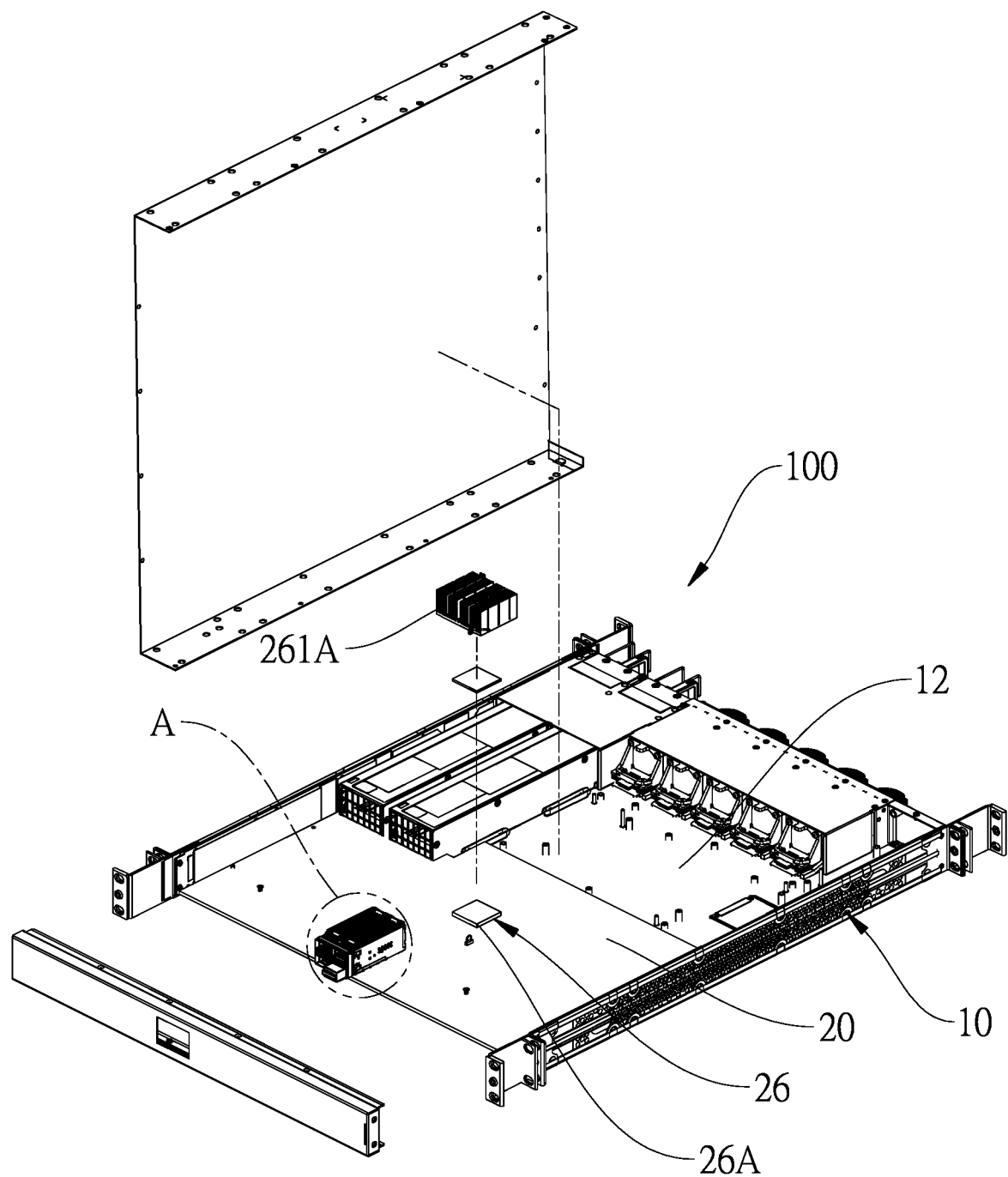
FIG. 2 is a schematic view of FIG. 1, showing the case and the thermal sink are partially separated.
Figure 3:
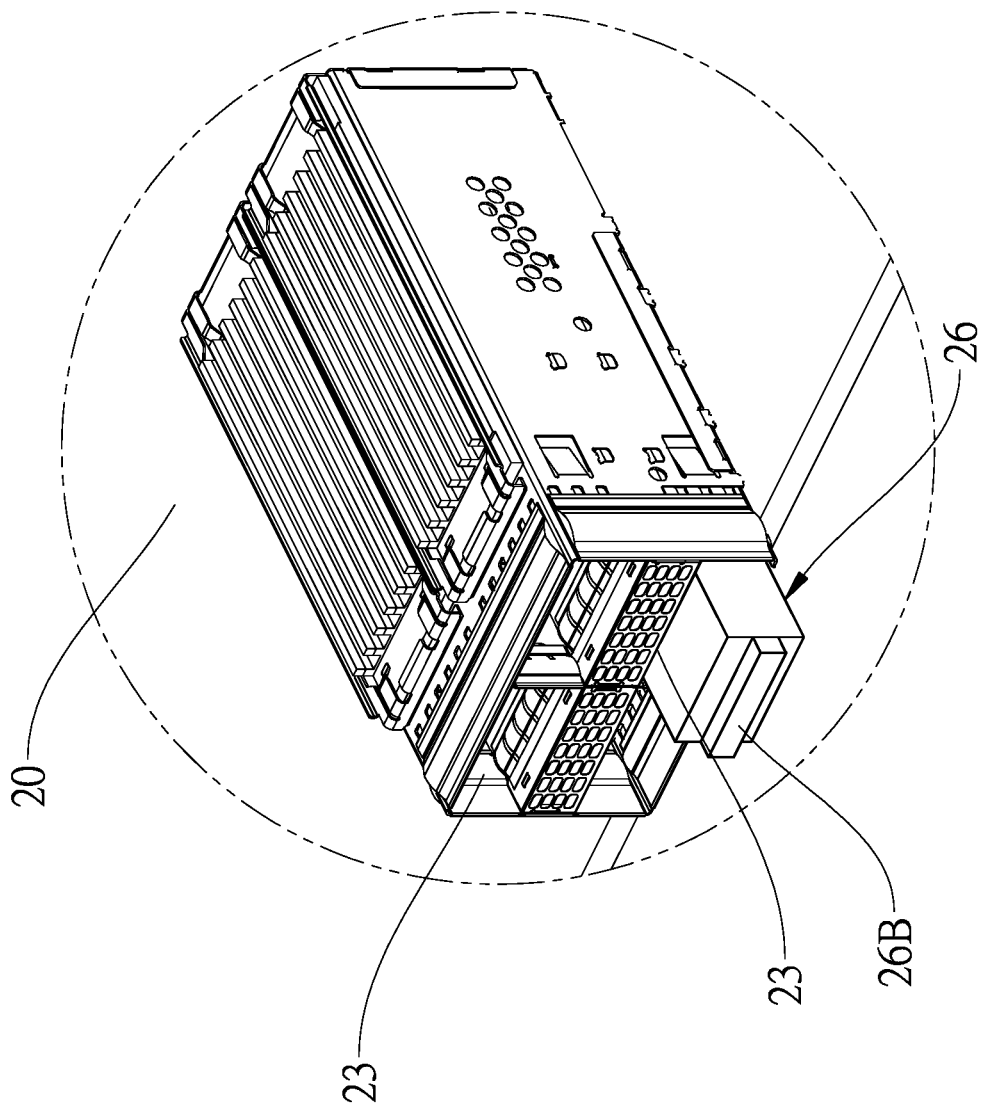
FIG. 3 is a partially enlarged view of a marked region A in FIG. 2.

A smart temperature control system of a network equipment according to an embodiment of the present invention is illustrated in FIG. 1 to FIG. 5. In the current embodiment, the network equipment is a network switch. The smart temperature control system 100 includes a case 10, a motherboard 20, and a plurality of cooling chips 30 engaged between the case 10 and the motherboard 20.

The case 10 is a rectangular box and has a plate 12. In the current embodiment, the plate 12 is a metal plate. In other embodiments, the plate 12 could be a plate having a good thermal conductivity, such as a plate made of thermal composite material.

Figure 4:
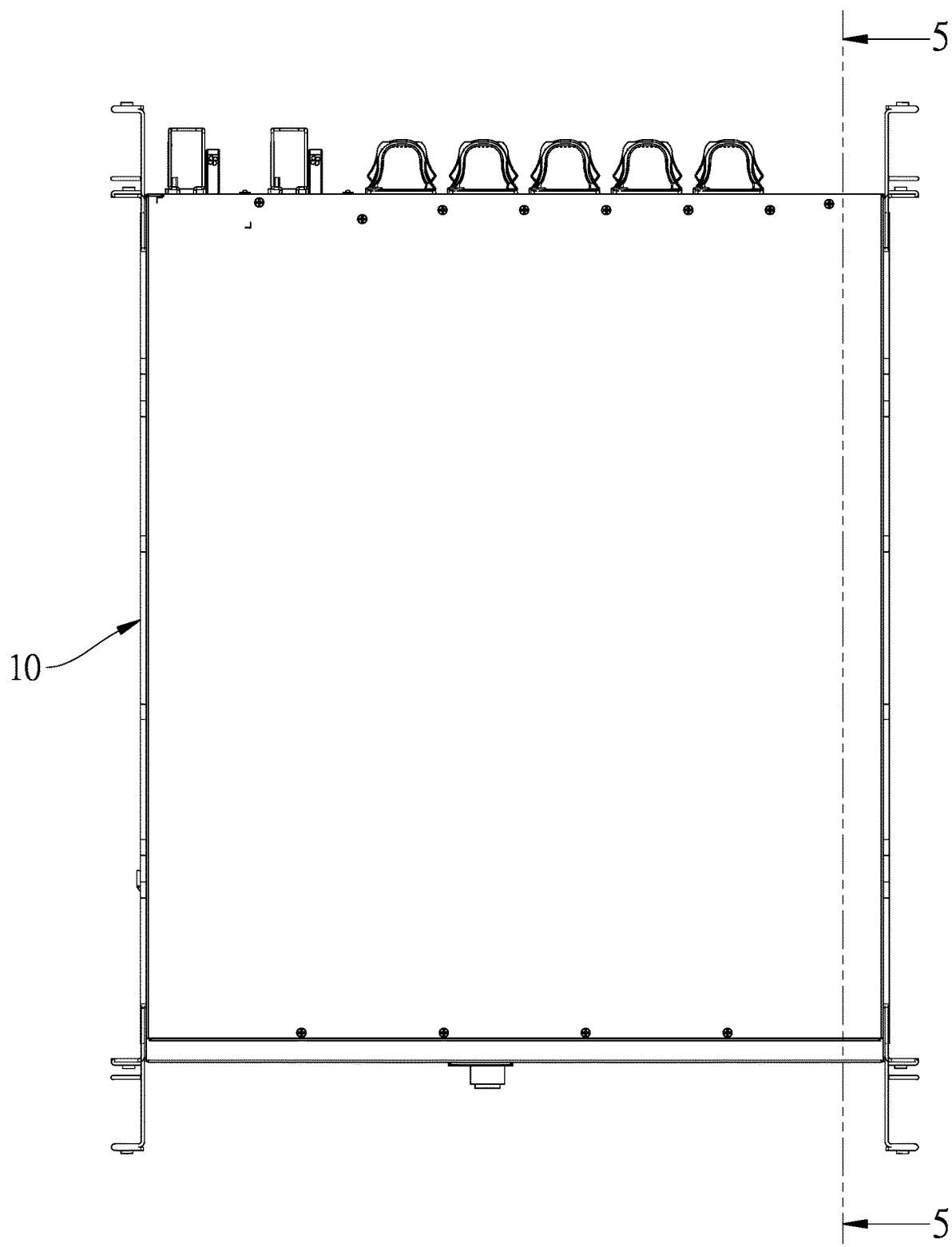
FIG. 4 is a top view of the smart temperature control system according to the embodiment of the present invention.
Figure 5:
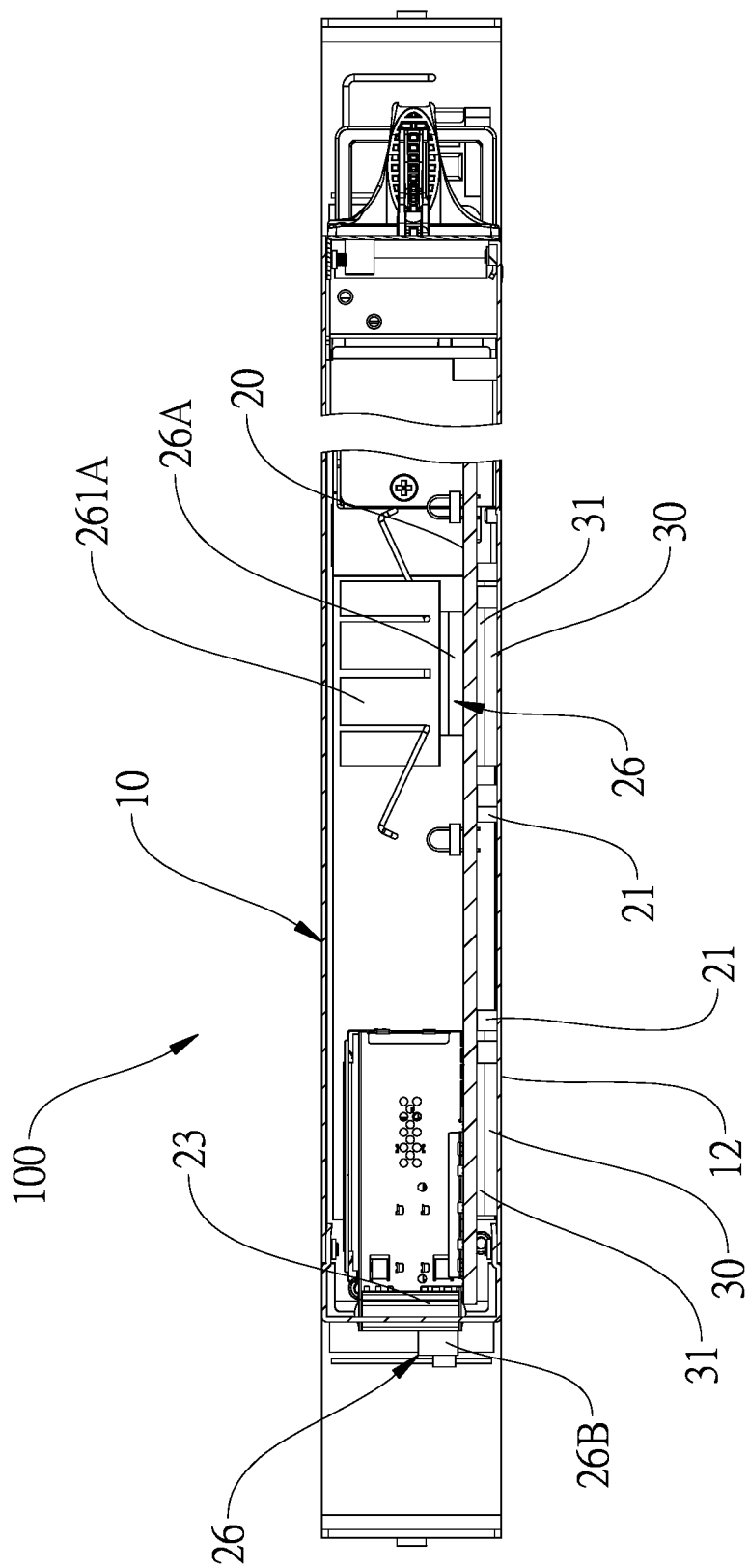
FIG. 5 is a section view along the 5-5 line of FIG. 4.
Figure 6:
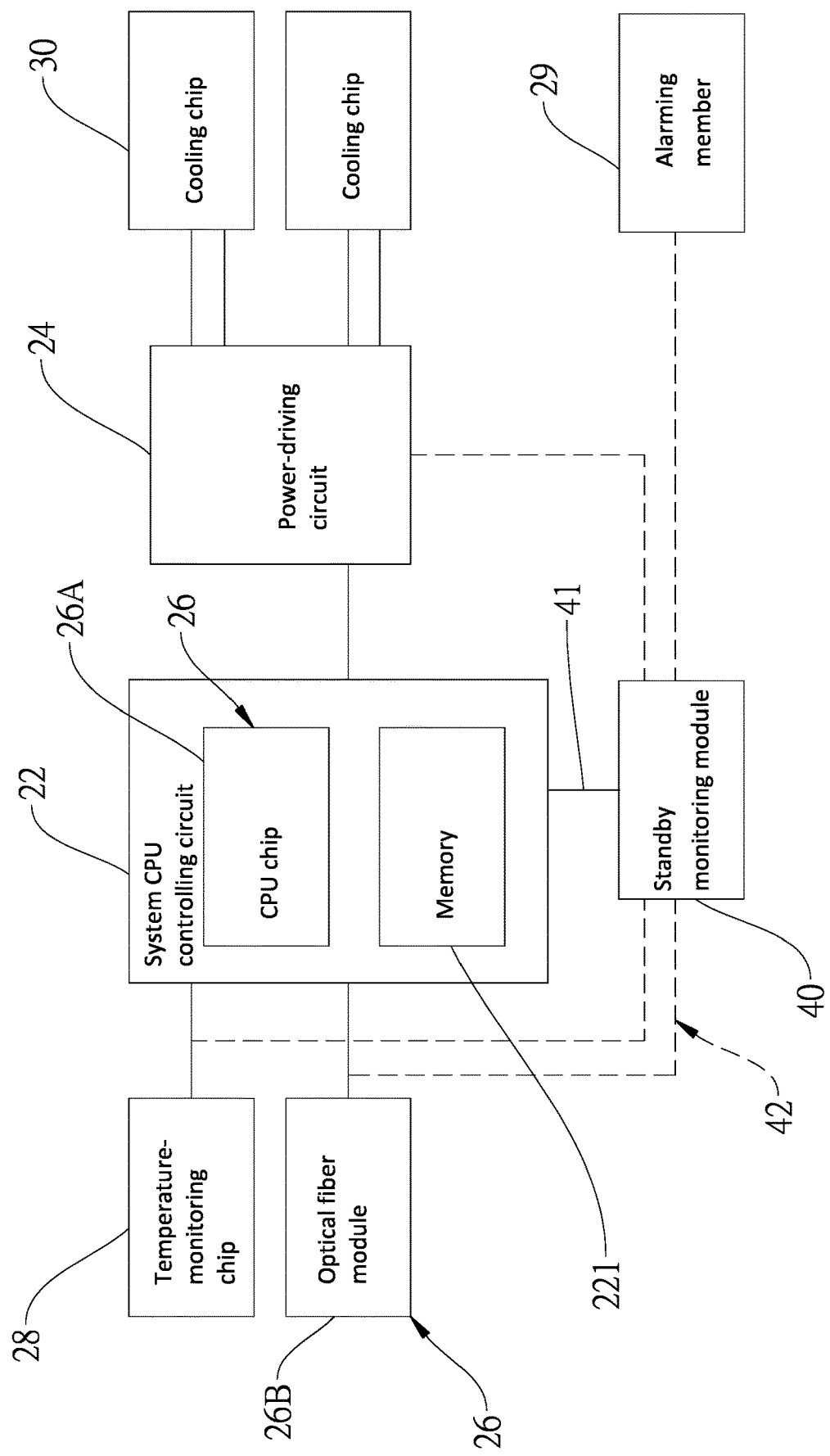
FIG. 6 is a block diagram of the temperature control structure according to the embodiment of the present invention.

The motherboard 20 is disposed in the case 10. More specifically, the motherboard 20 is engaged on the plate 12 through a support of a plurality of copper columns 21. As shown in FIG. 4 to FIG. 6, a system CPU controlling circuit 22, a power-driving circuit 24, and a plurality of temperature-controlled members 26 are disposed on the motherboard 20, wherein the system CPU controlling circuit 22 includes a memory 221 storing an operating temperature range of different models of the temperature-controlled members 26. The system CPU controlling circuit 22 is electrically and respectively connected to the power-driving circuit 24 and each of the temperature-controlled members 26, and is adapted to receive an information of a model and a real-time temperature of each of the temperature-controlled members 26. The system CPU controlling circuit 22 obtains an operating temperature range of each of the temperature-controlled members 26 by comparing the information of the model received with the different models in the memory 221.

Each of the cooling chips 30 is engaged between the plate 12 and a portion of the motherboard 20 where each of the temperature-controlled members 26 is disposed on, and is electrically connected to the power-driving circuit 24 to be driven by the power-driving circuit 24 through a voltage with a first polarity or a voltage with a second polarity opposite to the first polarity. The system CPU controlling circuit 22 compares the real-time temperature of one of the temperature-controlled members 26 with the operating temperature range of the corresponding temperature-controlled member 26 upon driving the cooling chips 30 via the power-driving circuit 24; when the real-time temperature of the temperature-controlled member 26 is higher than the operating temperature range of the corresponding temperature-controlled member 26, the system CPU controlling circuit 22 controls the power-driving circuit 24 to drive one of the cooling chips 30 via the voltage with the first polarity to cool the motherboard 20 and the temperature-controlled member 26 disposed on the motherboard 20, and heat dissipation is performed by the plate 12; when the real-time temperature of the temperature-controlled member 26 is lower than the operating temperature range of the temperature-controlled member 26, the system CPU controlling circuit 22 controls the power-driving circuit 24 to drive the cooling chip 30 via the voltage with the second polarity to heat the motherboard 20 and the temperature-controlled member 26 disposed on the mother board 20.

In the current embodiment, the plurality of temperature-controlled members 26 (including two or more) are disposed on the motherboard 20. In other embodiments, there could be only one temperature-controlled member 26 disposed on the motherboard 20; in such a case, only one cooling chip 30 is disposed between the plate 12 and a portion of the motherboard 20 provided with the temperature-controlled member 26 for being driven by the power-driving circuit 24 to cool or heat the temperature-controlled member 26 when the real-time temperature of the temperature-controlled member 26 falls out of the operating temperature range of the temperature-controlled member 26, thereby continuously keeping the temperature-controlled member 26 in the operating temperature range for properly operating when the network equipment operates. Additionally, in the current embodiment, a thermal pad 31 is further engaged between each of the cooling chips 30 and the motherboard 20. In other embodiments, the thermal pad 31 could be replaced by a thermal glue or a thermal grease, and the thermal pad 31, the thermal glue, and the thermal grease could be disposed between each of the cooling chips 30 and the plate 12 as well.

Referring to FIG. 4 to FIG. 6, in the current embodiment, the power-driving circuit 24 is a power Metal-Oxide-Semiconductor Field-Effect Transistor (MOSFET) driving circuit, and the memory 221 is a Flash Memory, a ROM, or a combination thereof; the memory 221 stores an operation system of the network equipment. The system CPU controlling circuit 22 further includes a CPU chip 26A disposed on the motherboard 20. In the current embodiment, the CPU chip 26A is one of the temperature-controlled members 26 and has a thermally sensitive diode therein that could detect a core temperature of the thermally sensitive diode by itself and store a value of the core temperature in a register in the thermally sensitive diode; a surface of the CPU chip 26A is engaged with a thermal sink 261A via a thermal glue or a thermal pad. The CPU chip 26A is electrically connected to the memory 221 and execute the operation system stored in the memory 221, wherein as the operating temperature range of the different models of temperature-controlled members 26 is included in the operation system, the operating temperature range corresponding to the model of the CPU chip 26A is included in the operation system as well.

A temperature-monitoring chip 28 is disposed at a position of the motherboard 20 adjacent to the CPU chip 26A, and is electrically connected to the system CPU controlling circuit 22. The information of the real-time temperature of the CPU chip 26A received by the system CPU controlling circuit 22 comes from the register of the CPU chip 26A (i.e., the core temperature) or the temperature-monitoring chip 28 (i.e., a surrounding temperature). An information of the model of the CPU chip 26A received by the system CPU controlling circuit 22 comes from the CPU chip 26A itself. The system CPU controlling circuit 22 obtains the operating temperature range of the CPU chip 26A by comparing the information of the model of the CPU chip 26A received and the models included in the operation system in the memory 221, wherein the operating temperature range of the CPU chip 26A is a temperature range of an operation specification of the CPU chip 26A.

The system CPU controlling circuit 22 compares the real-time temperature of the CPU chip 26A with the operating temperature range of the CPU chip 26A; when the real-time temperature of the CPU chip 26A is higher than the operating temperature range of the CPU chip 26A, the system CPU controlling circuit 22 controls the power-driving circuit 24 to drive one of the cooling chips 30 via the voltage with the first polarity to cool the motherboard 20 and the CPU chip 26A disposed on the motherboard 20, and heat dissipation is performed by the plate 12; when the real-time temperature of the CPU chip 26A is lower than the operating temperature range of the CPU chip 26A, the system CPU controlling circuit 22 controls the power-driving circuit 24 to drive the cooling chip 30 via the voltage with the second polarity to heat the motherboard 20 and the CPU chip 26A disposed on the motherboard 20; in this way, the real-time temperature of the CPU chip 26A could be kept in the operating temperature range of the CPU chip 26A, allowing the CPU chip 26A to properly operate.

Referring to FIG. 5 and FIG. 6, in the current embodiment, in order to prevent a temperature control function for controlling the power-driving circuit 24 to drive each of the cooling chips 30 for cooling or heating from failing when an abnormality occurs in the system CPU controlling circuit 22, a standby monitoring module 40 is further disposed on the motherboard 20 and has a function equivalent to the system CPU controlling circuit 22 to monitor the real-time temperature of each of the temperature-controlled members 26 and to control the power-driving circuit 24 to drive each of the cooling chips 30. A communication circuit 41 is connected between the standby monitoring module 40 and the system CPU controlling circuit 22, and the standby monitoring module 40 gets a state of the system CPU controlling circuit 22 at the moment, such as operating normally, failing, or being not activated, by communicating with the CPU chip 26A via the communication circuit 41. In this way, the standby monitoring module 40 could activate to substitute the system CPU controlling circuit 22 to control the power-driving circuit 24 to drive each of the cooling chips 30 when the system CPU controlling circuit 22 fails or is not activated. An alarming member 29 is disposed on the motherboard 20, and is electrically connected to the standby monitoring module 40. The standby monitoring module 40 controls the alarming member 29 to generate a system abnormality alarm with sound or light upon activating to substitute the system CPU controlling circuit 22.

The standby monitoring module 40 is electrically and respectively connected to the temperature-monitoring chip 28, the power-driving circuit 24, and the alarming member 29 via a standby circuit 42. When the system CPU controlling circuit 22 fails or is not activated, the standby monitoring module 40 activates to substitute the function of the system CPU controlling circuit 22 to monitor the real-time temperature of each of the temperature-controlled members 26 and to control the power-driving circuit 24; the standby monitoring module 40 receives the information of the real-time temperature of the CPU chip 26A from the temperature-monitoring chip 28 or the register of the CPU chip 26A, and controls the power-driving circuit 24 to drive one of the cooling chips 30 corresponding to the CPU chip 26A for cooling or heating when the real-time temperature of the CPU chip 26A falls out of the operating temperature range of the CPU chip 26A based on a result of comparing the real-time temperature of the CPU chip 26A with the operating temperature range of the CPU chip 26A, thereby keeping the real-time temperature of the CPU chip 26A in the operating temperature range of the CPU chip 26A.

Figure 7:
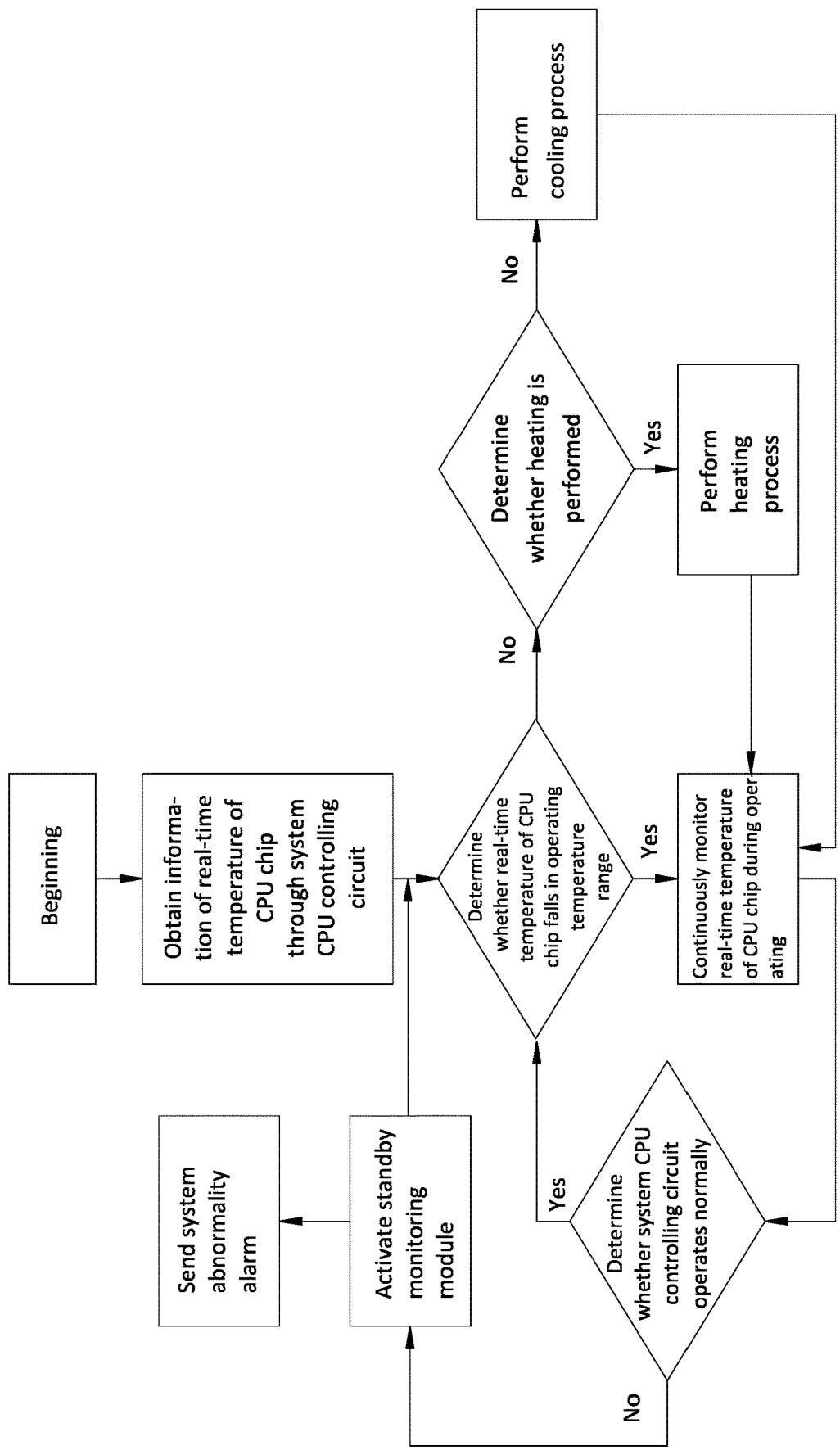
FIG. 7 is a flowchart of the temperature control and standby monitoring mechanism applied to the CPU chip.

FIG. 7 is a flowchart of a temperature control and standby monitoring mechanism applied to the CPU chip 26A. Referring to FIG. 5 to FIG. 7, at a beginning, after the operation system of the network equipment completes a booting process, the system CPU controlling circuit 22 obtains the information of the real-time temperature of the CPU chip 26A by reading the temperature-monitoring chip 28 or a temperature data of the register in the CPU chip 26A, and receives the information of the model of the CPU chip 26A from the CPU chip 26A to obtain the operating temperature range of the CPU chip 26A by comparing the information of the model received with the models in the operation system, and determines whether the real-time temperature of the CPU chip 26A falls in the operating temperature range of the CPU chip 26A; when the real-time temperature of the CPU chip 26A falls in the operating temperature range of the CPU chip 26A, the system CPU controlling circuit 22 continuously monitors the real-time temperature of the CPU chip 26A during operating; when the real-time temperature of the CPU chip 26A does not fall in the operating temperature range of the CPU chip 26A, the system CPU controlling circuit 22 determines whether heating is performed.

Upon determining whether heating is performed, when the real-time temperature of the CPU chip 26A is higher than the operating temperature range of the CPU chip 26A, a cooling process is performed; the system CPU controlling circuit 22 controls the power-driving circuit 24 to drive one of the cooling chips 30 corresponding to the CPU chip 26A to cool the motherboard 20 and the CPU chip 26A disposed on the motherboard 20, and heat dissipation is performed by the plate 12; when the real-time temperature of the CPU chip 26A is lower than the operating temperature range of the CPU chip 26A, a heating process is performed; the system CPU controlling circuit 22 controls the power-driving circuit 24 to drive one of the cooling chips 30 corresponding to the CPU chip 26A to heat the motherboard 20 and the CPU chip 26A disposed on the motherboard 20; with the cooling process or the heating process, the real-time temperature of the CPU chip 26A could be kept in the operating temperature range of the CPU chip 26A to ensure that the CPU chip 26A operates in the temperature range of the operation specification of the CPU chip 26A, and the system CPU controlling circuit 22 continuously monitors the real-time temperature of the CPU chip 26A during operating.

Then, the standby monitoring module 40 determines whether the system CPU controlling circuit 22 operates normally; when the system CPU controlling circuit 22 operates normally, the step of determining whether the real-time temperature of the CPU chip 26A falls in the operating temperature range of the CPU chip 26A is resumed; when the system CPU controlling circuit 22 does not operate normally, the standby monitoring module 40 activates; when the abnormality occurs in the system CPU controlling circuit 22, the standby monitoring module 40 substitutes the system CPU controlling circuit 22 to perform the step of determining whether the real-time temperature of the CPU chip 26A falls in the operating temperature range of the CPU chip 26A and afterwards to perform the step of determining whether heating is performed, and to continuously monitor the real-time temperature of the CPU chip 26A during operating, and controls the alarming member 29 to generate the system abnormality alarm.

Referring to FIG. 2, FIG. 3, FIG. 5, and FIG. 6, in the current embodiment, a plurality of slot connectors 23 respectively for mounting an optical fiber module 26B is disposed on the motherboard 20, wherein each of the slot connectors 23 is electrically connected to the controlling circuit 22 via an Inter-Integrated Circuit ($I^2C$) interface. At least one optical fiber module 26B matching with the slot connectors 23 is provided. In the current embodiment, the at least one optical fiber module 26B is one of the temperature-controlled members 26, and has a Digital Optical Monitoring (DDM) function to detect a real-time temperature of the at least one optical fiber module 26B by itself; when the optical fiber module 26B is inserted to any one of the slot connectors 23 to be connected to the slot connector 23, the system CPU controlling circuit 22 receives the information of the real-time temperature and the model of the optical fiber module 26B from the optical fiber module 26B via the $I^2C$ interface, and obtains the operating temperature range of the optical fiber module 26B by comparing the information of the model of the optical fiber module 26B with the models included in the operation system of the memory 221.

The system CPU controlling circuit 22 compares the real-time temperature of the optical fiber module 26B with the operating temperature range of the optical fiber module 26B; when the real-time temperature of the optical fiber module 26B is higher than the operating temperature range of the optical fiber module 26B, the system CPU controlling circuit 22 controls the power-driving circuit 24 to drive one of the cooling chips 30 via the voltage with the first polarity to cool the motherboard 20 and the optical fiber module 26B disposed on the motherboard 20, and heat dissipation is performed by the plate 12; when the real-time temperature of the optical fiber module 26B is lower than the operating temperature range of the optical fiber module 26B, the system CPU controlling circuit 22 controls the power-driving circuit 24 to drive the corresponding cooling chip 30 via the voltage with the second polarity to heat the motherboard 20 and the optical fiber module 26B disposed on the motherboard 20; in this way, the real-time temperature of the optical fiber module 26B during operating could be kept in the operating temperature range of the optical fiber module 26B, allowing the optical fiber module 26B to properly operate.

As shown in FIG. 5 and FIG. 6, the optical fiber module 26B is electrically connected to the standby monitoring module 40 through the slot connector 23 and the standby circuit 42 on the motherboard 20. Similarly, when the system CPU controlling circuit 22 fails or is not activated to make the standby monitoring module 40 activate to substitute the system CPU controlling circuit 22 to control the power-driving circuit 24 to drive each of the cooling chips 30, the standby monitoring module 40 does not only control the alarming member 29 to generate the system abnormality alarm with sound or light, but also substitute a controlling function of the system CPU controlling circuit 22 to receive the information of the real-time temperature of the optical fiber module 26B during operating from the optical fiber module 26B, and to control the power-driving circuit 24 to drive the cooling chip 30 corresponding to the optical fiber module 26B to cool or heat when the real-time temperature of the optical fiber module 26B fails out of the operating temperature range of the optical fiber module 26B based on a result of comparing the real-time temperature of the optical fiber module 26B with the operating temperature range of the optical fiber module 26B, keeping the real-time temperature of the optical fiber module 26B in the operating temperature range of the optical fiber module 26B.

When the abnormality occurs in the system CPU controlling circuit 22, the operation system executed by the CPU chip 26A could not add another optical fiber module 26B. At that time, the standby monitoring module 40 is only responsible for monitoring the at least one optical fiber module 26B that is existing, and controlling the power-driving circuit 24 to drive corresponding one of the cooling chips 30 to cool or heat the at least one optical fiber module 26B based on the result of comparing the real-time temperature of the at least one optical fiber module 26B with the operating temperature range of the at least one optical fiber module 26B; the standby monitoring module 40 only has a function of temperature monitoring and control, and does not substitute the system CPU controlling circuit 22 to perform functions other than temperature monitoring and control.

Figure 8:
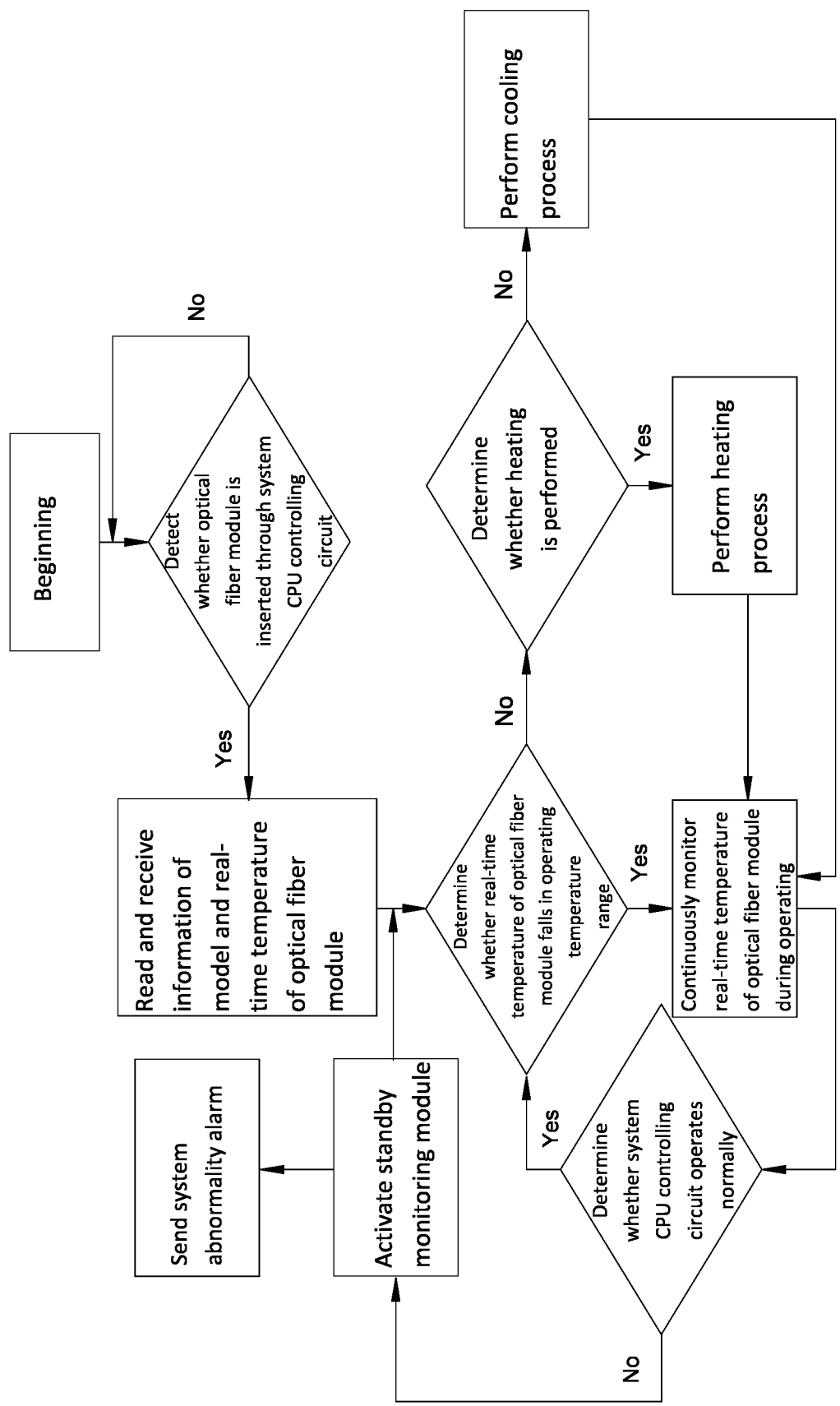
FIG. 8 is a flowchart of the temperature control and standby monitoring mechanism applied to the optical fiber module.

FIG. 8 is a flowchart of a temperature control and standby monitoring mechanism applied to the at least one optical fiber module 26B. Referring to FIG. 5, FIG. 6, and FIG. 8, at a beginning, the operation system determines whether the system CPU controlling circuit 22 detects that the at least one optical fiber module 26B is inserted; when the system CPU controlling circuit 22 does not detect that the at least one optical fiber module 26B is inserted, the system CPU controlling circuit 22 continues detecting; when the system CPU controlling circuit 22 detects that the at least one optical fiber module 26B is inserted, the system CPU controlling circuit 22 reads and receives the information of the model and the real-time temperature of the at least one optical fiber module 26B, and obtains the operating temperature range of the at least one optical fiber module 26B by comparing the information of the model of the at least one optical fiber module 26B received and the models in the operation system, and determines whether the real-time temperature of the at least one optical fiber module 26B falls in the operating temperature range of the at least one optical fiber module 26B; when the real-time temperature of the at least one optical fiber module 26B falls in the operating temperature range of the at least one optical fiber module 26B, the system CPU controlling circuit 22 continuously monitors the real-time temperature of the at least one optical fiber module 26B during operating; when the real-time temperature of the at least one optical fiber module 26B does not fall in the operating temperature range of the at least one optical fiber module 26B, the system CPU controlling circuit 22 determines whether heating is performed.

Upon determining whether heating is performed, when the real-time temperature of the at least one optical fiber module 26B is higher than the operating temperature range of the at least one optical fiber module 26B, a cooling process is performed; the system CPU controlling circuit 22 controls the power-driving circuit 24 to drive the cooling chip 30 corresponding to the at least one optical fiber module 26B to cool the motherboard 20 and the at least one optical fiber module 26B disposed on the motherboard 20, and heat dissipation is performed by the plate 12; when the real-time temperature of the at least one optical fiber module 26B is lower than the operating temperature range of the at least one optical fiber module 26B, a heating process is performed; the system CPU controlling circuit 22 controls the power-driving circuit 24 to drive the cooling chip 30 corresponding to the at least one optical fiber module 26B to heat the motherboard 20 and the at least one optical fiber module 26B disposed on the motherboard 20; with the cooling process or the heating process, the real-time temperature of the at least one optical fiber module 26B could be kept in the operating temperature range of the at least one optical fiber module 26B to ensure that the at least one optical fiber module 26B operates in a temperature range of an operation specification of the at least one optical fiber module 26B, and the system CPU controlling circuit 22 continuously monitors the real-time temperature of the at least one optical fiber module 26B during operating.

Then, the standby monitoring module 40 determines whether the system CPU controlling circuit 22 operates normally; when the system CPU controlling circuit 22 operates normally, the step of determining whether the real-time temperature of the at least one optical fiber module 26B falls in the operating temperature range of the at least one optical fiber module 26B is resumed; when the system CPU controlling circuit 22 does not operate normally, the standby monitoring module 40 is activated; when the abnormality occurs in the system CPU controlling circuit 22, the standby monitoring module 40 substitutes the system CPU controlling circuit 22 to perform the step of determining whether the real-time temperature of the at least one optical fiber module 26B falls in the operating temperature range of the at least one optical fiber module 26B and afterwards to perform the step of determining whether heating is performed, and to continuously monitor the real-time temperature of the at least one optical fiber module 26B during operating, and controls the alarming member 29 to generate the system abnormality alarm.

It must be pointed out that the embodiments described above are only some preferred embodiments of the present invention. All equivalent structures which employ the concepts disclosed in this specification and the appended claims should fall within the scope of the present invention.

What is claimed is:

1. A smart temperature control system of a network equipment, comprising:
    a case having a plate;
    a motherboard disposed in the case, wherein a system CPU controlling circuit, a power-driving circuit, and a plurality of temperature-controlled members are disposed on the motherboard; the system CPU controlling circuit comprises a memory storing an operating temperature range of different models of the plurality of temperature-controlled members, and is electrically and respectively connected to the power-driving circuit and the plurality of temperature-controlled members, and receives an information of a real-time temperature and a model of the plurality of temperature-controlled members; the system CPU controlling circuit obtains an operating temperature range of each of the temperature-controlled members by comparing the information of the model of the plurality of temperature-controlled members received with the different models of the plurality of temperature-controlled members in the memory; and
    a plurality of cooling chips, each of the plurality of cooling chips engaging between the plate and a portion of the motherboard where each of the temperature-controlled members is disposed on, and electrically connected to the power-driving circuit to be driven by the power-driving circuit via a voltage with a first polarity or a voltage with a second polarity opposite to the first polarity; the system CPU controlling circuit compares the real-time temperature of each of the temperature-controlled members with the operating temperature range of each of the temperature-controlled members; when the real-time temperature of one of the plurality of temperature-controlled members is higher than the operating temperature range of one of the plurality of temperature-controlled members, the system CPU controlling circuit controls the power-driving circuit to drive one of the plurality of cooling chips via the voltage with the first polarity to cool the motherboard and the one of the plurality of temperature-controlled members disposed on the motherboard, and heat dissipation is performed by the plate; when the real-time temperature of one of the plurality of temperature-controlled members is lower than the operating temperature range of one of the plurality of temperature-controlled members, the system CPU controlling circuit controls the power-driving circuit to drive one of the plurality of cooling chips via the voltage with the second polarity to heat the motherboard and the one of the plurality of temperature-controlled members disposed on the motherboard.

2. The smart temperature control system as claimed in claim 1, wherein a standby monitoring module is disposed on the motherboard, and a communication circuit is connected between the standby monitoring module and the system CPU controlling circuit; the standby monitoring module is electrically and respectively connected to each of the temperature-controlled members and the power-driving circuit through a standby circuit; the standby monitoring module gets a state of the system CPU controlling circuit via the communication circuit, and activates to substitute the system CPU controlling circuit to compare the real-time temperature of each of the temperature-controlled members with the operating temperature range of each of the temperature-controlled members, and to control the power-driving circuit to drive the one cooling chip via the voltage with the first polarity or the voltage with the second polarity when the system CPU controlling circuit fails or is not activated.

3. The smart temperature control system as claimed in claim 2, wherein a temperature-monitoring chip is disposed at a position of the motherboard adjacent to each of the temperature-controlled members, and is electrically connected to the system CPU controlling circuit, and is electrically connected to the standby monitoring module through the standby circuit; the information of the real-time temperature of each of the temperature-controlled members received by the system CPU controlling circuit comes from the temperature-monitoring chip.

4. The smart temperature control system as claimed in claim 2, wherein an alarming member is disposed on the motherboard and is electrically connected to the standby monitoring module; when the standby monitoring module activates, the alarming member is controlled to generate a system abnormality alarm.

5. The smart temperature control system as claimed in claim 1, wherein each of the temperature-controlled members is a CPU chip of the system CPU controlling circuit; the information of the real-time temperature of the CPU chip received by the system CPU controlling circuit comes from the CPU chip.

6. The smart temperature control system as claimed in claim 2, wherein each of the temperature-controlled members is a CPU chip of the system CPU controlling circuit; the information of the real-time temperature of the CPU chip received by the system CPU controlling circuit comes from the CPU chip.

7. The smart temperature control system as claimed in claim 3, wherein the each of the temperature-controlled members is a CPU chip of the system CPU controlling circuit; the information of the real-time temperature of the CPU chip received by the system CPU controlling circuit comes from the CPU chip.

8. The smart temperature control system as claimed in claim 4, wherein each of the temperature-controlled members is a CPU chip of the system CPU controlling circuit; the information of the real-time temperature of the CPU chip received by the system CPU controlling circuit comes from the CPU chip.

9. The smart temperature control system as claimed in claim 5, wherein the CPU chip is electrically connected to the memory and executes an operation system stored in the memory; the operating temperature range corresponding to the model of the CPU chip is comprised in the operation system.

10. The smart temperature control system as claimed in claim 6, wherein the CPU chip is electrically connected to the memory and executes an operation system stored in the memory; the operating temperature range corresponding to the model of the CPU chip is comprised in the operation system.

11. The smart temperature control system as claimed in claim 7, wherein the CPU chip is electrically connected to the memory and executes an operation system stored in the memory; the operating temperature range corresponding to the model of the CPU chip is comprised in the operation system.

12. The smart temperature control system as claimed in claim 8, wherein the CPU chip is electrically connected to the memory and executes an operation system stored in the memory; the operating temperature range corresponding to the model of the CPU chip is comprised in the operation system.

13. The smart temperature control system as claimed in claim 5, wherein a surface of the CPU chip is engaged with a thermal sink.

14. The smart temperature control system as claimed in claim 6, wherein a surface of the CPU chip is engaged with a thermal sink.

15. The smart temperature control system as claimed in claim 7, wherein a surface of the CPU chip is engaged with a thermal sink.

16. The smart temperature control system as claimed in claim 8, wherein a surface of the CPU chip is engaged with a thermal sink.

17. The smart temperature control system as claimed in claim 1, wherein a plurality of slot connectors respectively for mounting an optical fiber module is disposed on the motherboard; each of the plurality of slot connectors is electrically connected to the system CPU controlling circuit; each of the temperature-controlled members is an optical fiber module having a Digital Optical Monitoring (DDM) function; the optical fiber module is inserted to one of the plurality of slot connectors; the information of the real-time temperature of the optical fiber module received by the system CPU controlling circuit comes from the optical fiber module.

18. The smart temperature control system as claimed in claim 2, wherein a plurality of slot connectors respectively for mounting an optical fiber module is disposed on the motherboard; each of the plurality of slot connectors is electrically connected to the system CPU controlling circuit, and is electrically connected to the standby monitoring module through the standby circuit; each of the temperature-controlled members is an optical fiber module having a Digital Optical Monitoring (DDM) function; the optical fiber module is inserted to one of the plurality of slot connectors; the information of the real-time temperature of the optical fiber module received by the standby monitoring module comes from the optical fiber module.

19. The smart temperature control system as claimed in claim 3, wherein a plurality of slot connectors respectively for mounting an optical fiber module is disposed on the motherboard; each of the plurality of slot connectors is electrically connected to the system CPU controlling circuit, and is electrically connected to the standby monitoring module through the standby circuit; each of the temperature-controlled members is an optical fiber module having a Digital Optical Monitoring (DDM) function; the optical fiber module is inserted to one of the plurality of slot connectors; the information of the real-time temperature of the optical fiber module received by the standby monitoring module comes from the optical fiber module.

20. The smart temperature control system as claimed in claim 1, wherein a thermal pad is engaged between the one cooling chip and the motherboard.

* * * * *